(12) United States Patent
Won et al.

(10) Patent No.: US 9,948,523 B2
(45) Date of Patent: Apr. 17, 2018

(54) DISPLAY METHOD AND MOBILE DEVICE

(71) Applicant: Samsung Electronics Co., Ltd., Suwon-si, Gyeonggi-do (KR)

(72) Inventors: Sungjoon Won, Seongnam-si (KR); Daesung Kim, Gwacheon-si (KR); Jinyong Kim, Yongin-si (KR); Joah Choi, Seoul (KR); Huichul Yang, Yongin-si (KR); Yun Jegal, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 14/613,634

(22) Filed: Feb. 4, 2015

(65) Prior Publication Data

US 2015/0237493 A1 Aug. 20, 2015

(30) Foreign Application Priority Data

Feb. 17, 2014 (KR) .................. 10-2014-0017737

(51) Int. Cl.
*G06F 3/048* (2013.01)
*H04L 12/24* (2006.01)
(Continued)

(52) U.S. Cl.
CPC ............ *H04L 41/22* (2013.01); *G06F 3/0488* (2013.01); *G06F 3/04817* (2013.01);
(Continued)

(58) Field of Classification Search
CPC ...... G06F 3/048–3/04886; G06F 3/011; G06F 3/017; G06F 3/126; G06F 3/1226; G06F 3/1247; G06F 3/1285; G06F 3/1292; G06F 17/3087; G06Q 20/3278; G06Q 20/4016; G06Q 30/02; G06Q 30/0261; G06Q 30/0267; G06Q 30/0269; G06Q 30/0601; G06Q 50/01; H04L 41/0803; H04L 41/22; H04L 61/2038; H04L 63/20; H04L 67/16; H04L 67/18; H04L 67/24; H04L 67/306; H04L 2012/2841; H04M 1/2478; H04M 1/72513; H04M 1/7253; H04M 1/72583; H04M 2207/18; H04M 2250/02; H04W 4/001; H04W 4/008; H04W 4/02;
(Continued)

(56) References Cited

U.S. PATENT DOCUMENTS

2009/0029736 A1* 1/2009 Kim .................. H04M 1/72522
455/558
2009/0177810 A1 7/2009 Kweon et al.
(Continued)

FOREIGN PATENT DOCUMENTS

KR 10-2009-0076104 A 7/2009

*Primary Examiner* — Claudia Dragoescu
(74) *Attorney, Agent, or Firm* — Jefferson IP Law, LLP

(57) ABSTRACT

An information display method for displaying diverse communication protocol information in order is provided. The communication protocol information display method of a mobile device includes discovering devices connectable through diverse communication protocols, displaying information on the discovered devices, displaying symbols of communication protocols supported by the discovered devices respectively, and displaying image objects associated with applications or functions for use in interoperation with the discovered devices.

26 Claims, 15 Drawing Sheets

(51) Int. Cl.
    *H04W 4/00*     (2018.01)
    *G06F 3/0481*     (2013.01)
    *G06F 3/0488*     (2013.01)
    *G06F 3/0484*     (2013.01)
    *H04L 29/08*     (2006.01)

(52) U.S. Cl.
    CPC .......... *G06F 3/04842* (2013.01); *H04L 67/16* (2013.01); *H04W 4/008* (2013.01)

(58) Field of Classification Search
    CPC ..... H04W 4/023; H04W 4/028; H04W 76/02; H04W 8/005; H04W 64/00
    See application file for complete search history.

(56) References Cited

U.S. PATENT DOCUMENTS

| | | | |
|---|---|---|---|
| 2009/0228820 A1* | 9/2009 | Kim | G06F 3/04817 715/769 |
| 2010/0138794 A1* | 6/2010 | Ganey | G06F 3/04817 715/853 |
| 2010/0169817 A1* | 7/2010 | Want | G06F 3/04817 715/772 |
| 2010/0285785 A1* | 11/2010 | Wang | G06F 1/165 455/418 |
| 2011/0083111 A1* | 4/2011 | Forutanpour | G06F 1/1694 715/863 |
| 2012/0089974 A1* | 4/2012 | Cho | G06F 8/61 717/173 |
| 2012/0151400 A1* | 6/2012 | Hong | G06F 3/04817 715/769 |
| 2012/0159340 A1 | 6/2012 | Bae et al. | |
| 2012/0331156 A1* | 12/2012 | Colpitts | H04L 12/2818 709/227 |
| 2013/0097512 A1 | 4/2013 | Hong et al. | |
| 2013/0174237 A1 | 7/2013 | Zises | |
| 2014/0267103 A1* | 9/2014 | Chaudhri | G09G 5/14 345/173 |
| 2015/0146019 A1* | 5/2015 | Aoyama | H04N 1/00129 348/207.1 |

* cited by examiner

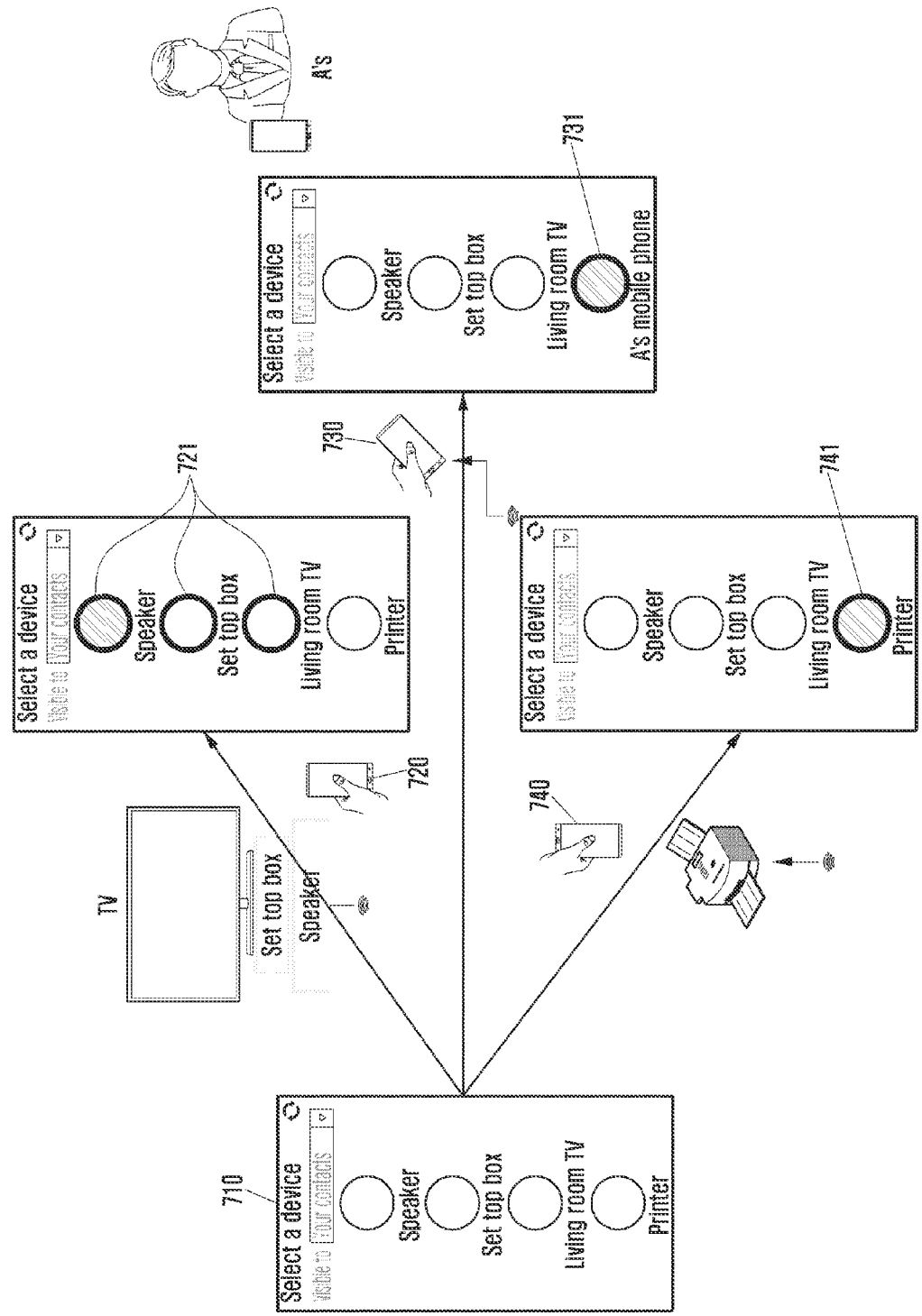

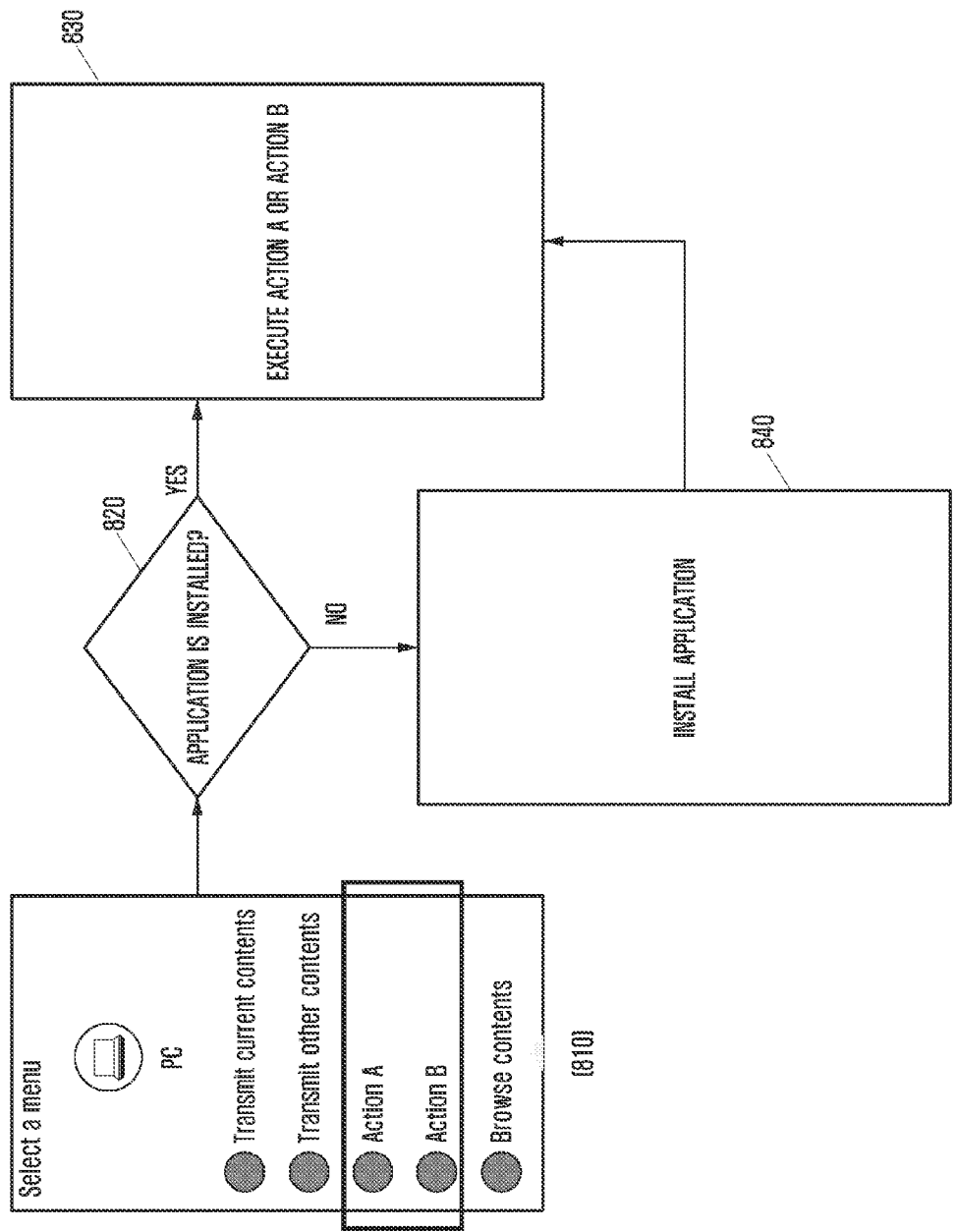

DISPLAY METHOD AND MOBILE DEVICE

CROSS-REFERENCE TO RELATED APPLICATION(S)

This application claims the benefit under 35 U.S.C. § 119(a) of a Korean patent application filed on Feb. 17, 2014 in the Korean Intellectual Property Office and assigned Serial number 10-2014-0017737, the entire disclosure of which is hereby incorporated by reference.

TECHNICAL FIELD

The present disclosure relates to a method of displaying diverse communication protocol information in order.

BACKGROUND

A mobile terminal is embedded with advanced features such as document composition, motion picture editing, and Internet access, as well as primary services such as voice telephony and text messaging. The mobile terminal is capable of exchanging data with other devices through various communication schemes.

The mobile terminal supports various communication schemes such as Wireless Fidelity (Wi-Fi), Bluetooth, and Near Field Communication (NFC). However, the legacy mobile terminal is designed such that the user has to enter a communication settings menu to enable or disable certain communication protocols. Accordingly, in order to configure multiple communication protocols, the user has to spend a lot of time repeating such a cumbersome manipulation of a user interface.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present disclosure, a communication protocol information display method of a mobile device is provided. The method includes discovering devices connectable through diverse communication protocols, displaying information on the discovered devices, displaying symbols of communication protocols supported by the discovered devices respectively, and displaying image objects associated with applications or functions for use in interoperation with the discovered devices.

In accordance with another aspect of the present disclosure, a mobile device is provided. The mobile device includes a control unit configured to discover devices connectable diverse communication protocols and a display unit configured to display information on the discovered devices, symbols of communication protocols supported by the discovered devices respectively, and image objects associated with applications or functions for use in interoperation with the discovered devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a diagram illustrating an operation of establishing a connection with a device by pointing at a corresponding device according to an embodiment of the present disclosure;

FIG. 8 is a diagram illustrating an operation of determining whether execution-requested application is installed according to an embodiment of the present disclosure;

Throughout the drawings, it should be noted that like reference numbers are used to depict the same or similar elements, features, and structures.

DETAILED DESCRIPTION

Figure 1:
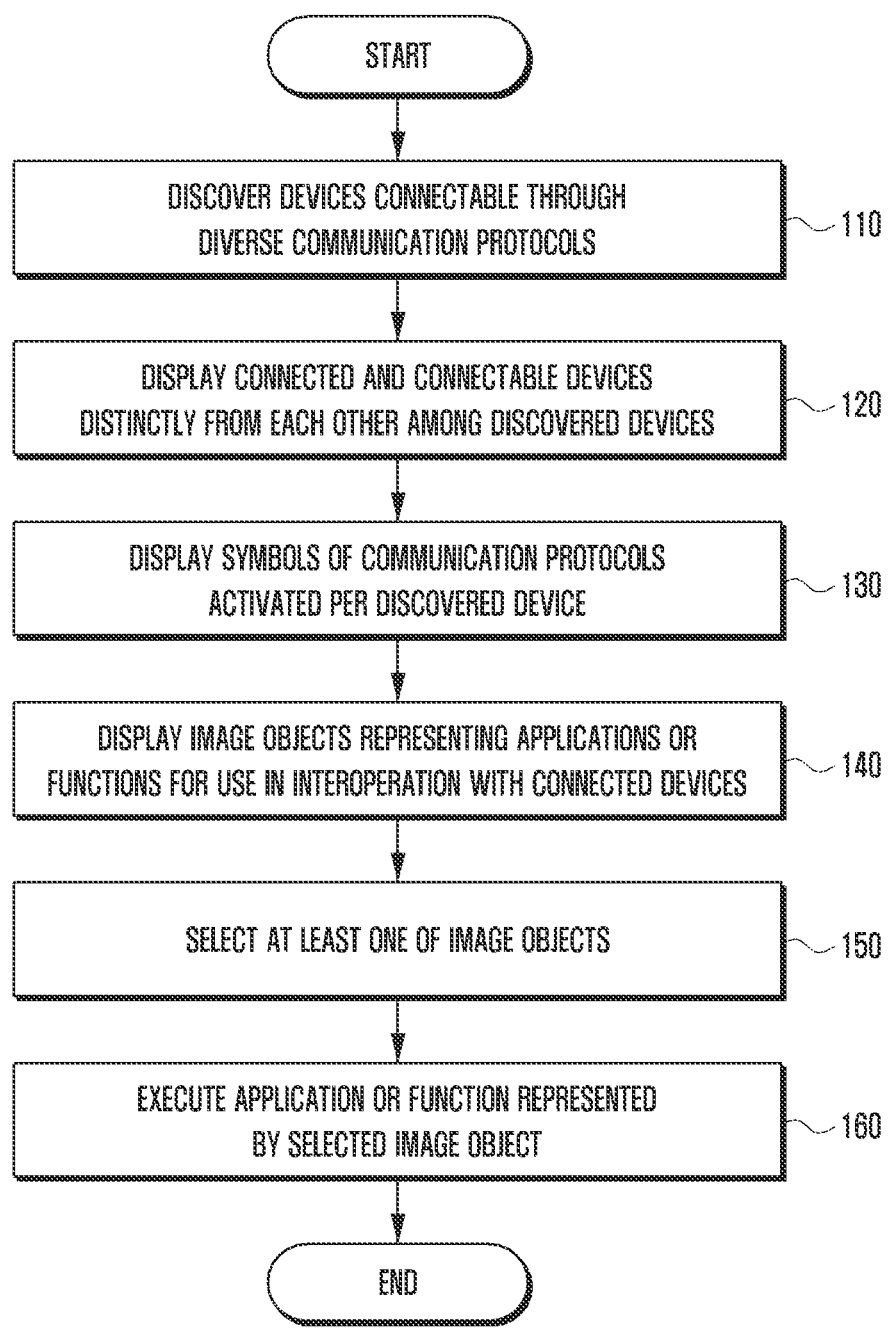
FIG. 1 is a flowchart illustrating an information display method according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The mobile device proposed in the present disclosure may be an electronic device. The electronic device has communication function. Examples of the electronic device include a smartphone, a table Personal Computer (PC), a mobile phone, a video phone, an electronic book (ebook) reader, a desktop PC, a laptop computer, a netbook computer, a Personal Digital Assistant (PDA), a Portable Multimedia Player (PMP), a Moving Picture Experts Group (MPEG-1 or MPEG-2) Audio Layer III (MP3) player, a mobile medical appliance, a camera, a wearable device (e.g., electronic glasses and Head Mounted Device (HMD)), an electronic clothes, an electronic bracelet, an electronic necklace, an electronic appcessory, an electronic tattoo, and a smartwatch.

According to certain embodiments, the electronic device may be a smart home appliance equipped with a communication function. Examples of the smart home appliance include a Television (TV), a Digital Video Disk (DVD) player, an audio, a refrigerator, an air conditioner, a vacuum cleaner, an oven, a microwave oven, a laundry machine, an air cleaner, a set-top box, a TC box (e.g., Samsung HomeSync™, apple TV™, and google TV™), a game console, an electronic dictionary, an electronic key, a camcorder, and an electronic frame.

According to certain embodiments, examples of the electronic device include a medical device (e.g., Magnetic Resonance Angiography (MRA), Magnetic Resonance Imaging (MRI), a Navigation device, a Global Positioning System (GPS) receiver, an Event Data Recorder (EDR), a Flight Data Recorder (FDR), a car infotainment device, electronic equipment for ship (e.g., a maritime navigation device and a gyro compass), an aviation electronic device (avionics), a security device, and an industrial or home robot.

According to certain embodiments, examples of the electronic device may include furniture or part of building/construction which has a communication function, an electronic board, an electronic signature receiving device, a projector, and a metering device (e.g., water, electricity, and electric wave metering devices). According to an embodiment, the electronic device may be one or any combination of the above enumerated devices. It is obvious to those in the art that the electronic device of the present disclosure is not limited to the aforementioned devices.

The present disclosure aims to provide an information display method and mobile device therefor that is capable of improving user convenience in such a way of displaying a plurality of available communication protocols and per-protocol connected devices and applications executable per connected device at a time.

FIG. 1 is a flowchart illustrating an information display method according to an embodiment of the present disclosure.

Referring to FIG. 1, a mobile device discovers connectable devices supporting at last one communication protocol at operation 110. Examples of the communication protocol include Bluetooth, Wi-Fi, Samsung Link, Near Field Communication (NFC), and Universal Serial Bus (USB). In the state of displaying the communication protocol settings menu screen, the mobile device may discover the connectable devices supporting at least one communication protocol according to a preset condition or in response to a touch gesture made on the screen. That is, the mobile device may discover the devices connectable using a plurality of communication protocols.

Next, the mobile device displays the information on the discovered devices at operation 120. The discovered devices may include the connected and connectable devices. The connectable device is the device which is discovered but not connected yet. If the connectable device is selected by the user, the mobile device attempts to establish a connection to the connectable device for communication. Once a connection to the connectable device is established, the corresponding device becomes the connected device. The mobile device may display the name or image of the connected device as the information of the corresponding device.

The mobile device displays a symbol representing the communication protocol available for the presented device at operation 130. The symbol may be designed to identify the communication protocol intuitively. For example, the symbol may be an icon representing the communication protocol.

The mobile device displays an image pertaining to the application or function for use in interoperation with the presented device at operation 140. The image may be designed with or without text to identify the application or function intuitively. For example, the image may be an icon designed with at least one of an image and a text.

The mobile device may receive a user's selection of at least one of the presented image objects at operation 150. The mobile device may execute the application or function related to the selected image at operation 160.

Figure 2:
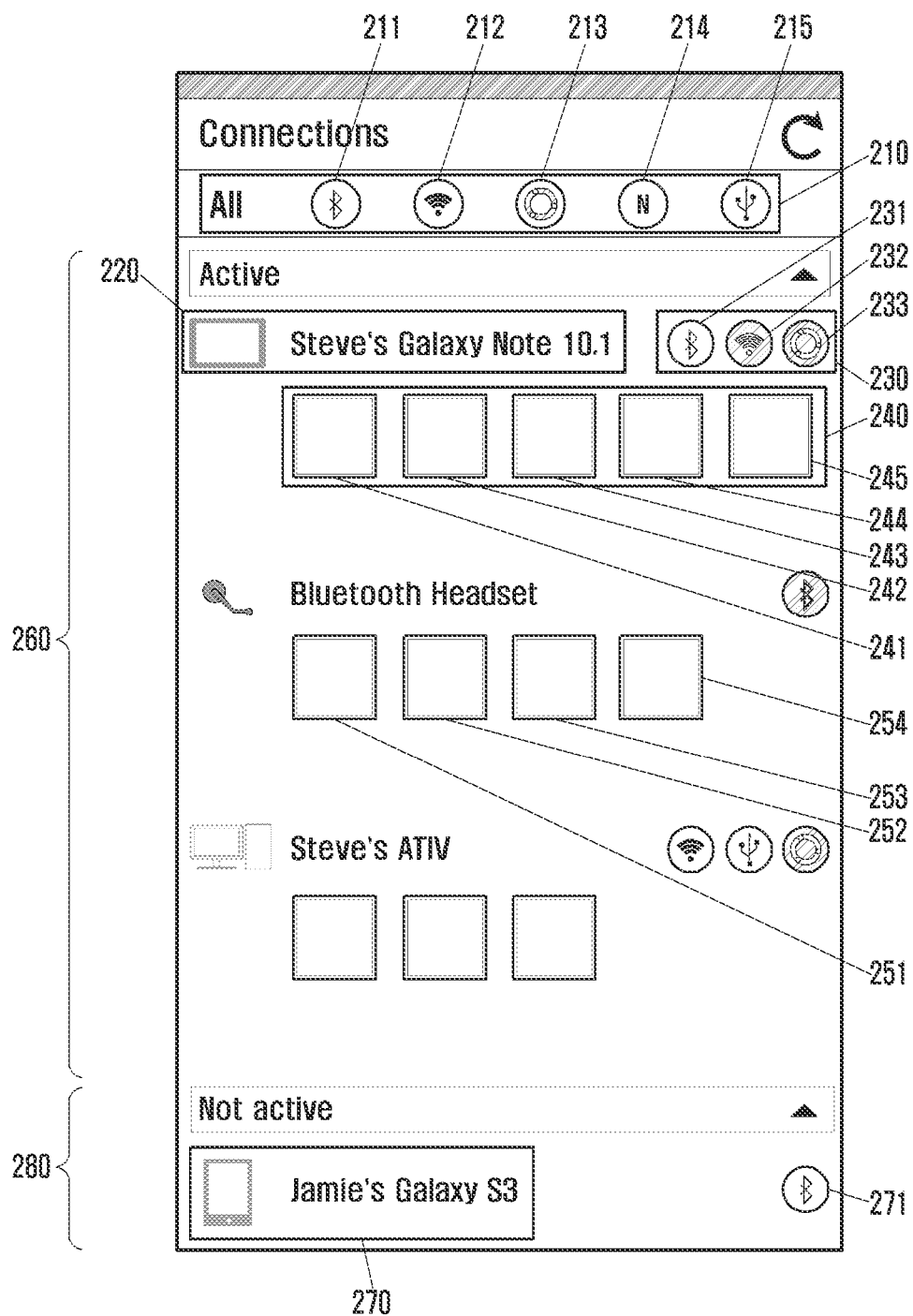
FIG. 2 is a diagram illustrating exemplary communication protocol setting menu screen according to an embodiment of the present disclosure.

FIG. 2 is a diagram illustrating exemplary communication protocol setting menu screen according to an embodiment of the present disclosure.

Referring to FIG. 2, a mobile device discovers the devices connectable through diverse communication protocols and displays the discovered devices along with the communication protocols supported thereby. The mobile device may display a symbol set 210. The symbol set 210 may include a Bluetooth symbol 211, a Wi-Fi symbol 212, a Samsung link symbol 213, a NFC symbol 214, and a USB symbol 215. The mobile device may display the communication protocol symbols in an order of priorities of communication protocols.

The mobile device displays the information of the discovered devices. The discovered devices may be sorted into the connected device list (Active) 260 and the connectable device list (Not active) 280. The connected device list 260 includes Steve's Galaxy Note 10.1 220, Bluetooth Headset, and Steve's ATIV. The connectable list 280 includes Jamie's Galaxy S3 270.

The mobile device also displays communication protocol symbols 231, 232, 233, and 271 representing the communication protocols supported by the discovered devices. The communication protocol symbols are placed by the discovered device information. For example, a symbol set 230 including the communication protocol symbols 231, 232, and 233 shows the communication protocols through which the mobile device may communicate with the Steve's Galaxy Note 10.1 220. The communication protocol symbol set 230 of the Steve's Galaxy Note 10.1 220 includes a Bluetooth symbol 231, a Wi-Fi symbol 232, and a Samsung link symbol 233. At this time, the mobile device may display the symbols 232 and 233 representing Wi-Fi and Samsung link through which the Steve's Galaxy Note 10.1 is connected distinctly from the symbol 231 representing Bluetooth through which Steve's Galaxy Note 10.1 is not connected.

The mobile device may also display image object set 240. The image object set 240 may include image objects representing the applications or functions with which the mobile device is capable of interoperating with the connected devices 260. The image object set 240 includes the image objects in the form of icons, that is, a side link icon 241, a Samsung link icon 242, a file exchange icon 243, a settings icon 244, and a connection release icon 245. The image object set of the Bluetooth Headset may include a phone icon 251, a music icon 252, a setting icon 253, and a connection release icon 254. The image object set may be displayed per device. The mobile device may display the applications or functions pertaining to the connected devices 260 but not the applications or function pertaining to the connectable devices 280.

The information display method according to an embodiment of the present disclosure is capable of displaying the communication protocols supported per discovered device and available applications per communication protocol at a time to improve user convenience.

Figure 3:
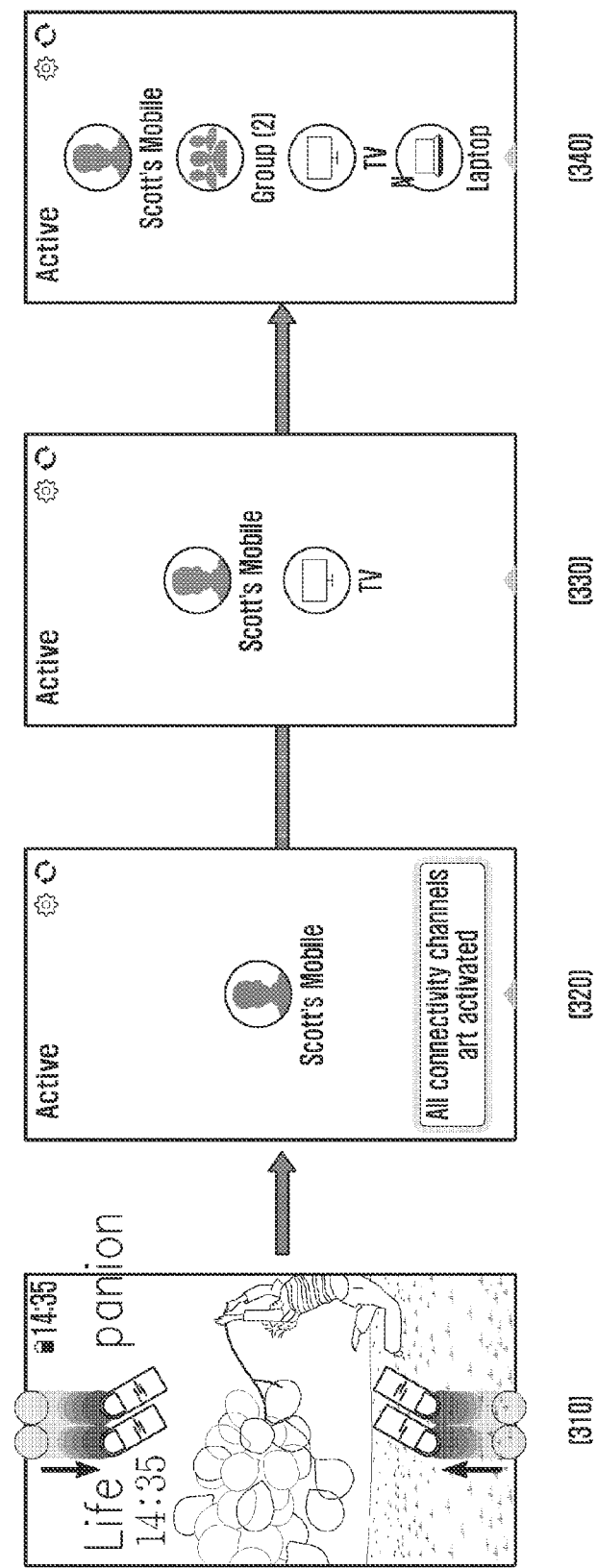
FIG. 3 is a diagram illustrating exemplary screen displays of discovery of devices connectable through diverse communication protocols according to an embodiment of the present disclosure.

FIG. 3 is a diagram illustrating exemplary screen displays of discovery of devices connectable through diverse communication protocols according to an embodiment of the present disclosure.

Referring to FIG. 3, a mobile device may detect a touch gesture on a touchscreen. The mobile device may determine whether the touch gesture is a gesture moving downward from the top edge of the screen or upward from the bottom edge of the screen as shown in part (310). If the touch gesture is made download or upward, this means that a drag gesture is made from a first touch point to a second touch point. If it is determined that the touch gesture is made downward or upward, the mobile device discovers the devices connectable through diverse communication protocols as shown in part (320). The mobile device displays, whenever a device is discovered, the discovered device in sequence as shown in parts (330) and (340).

Figure 4:
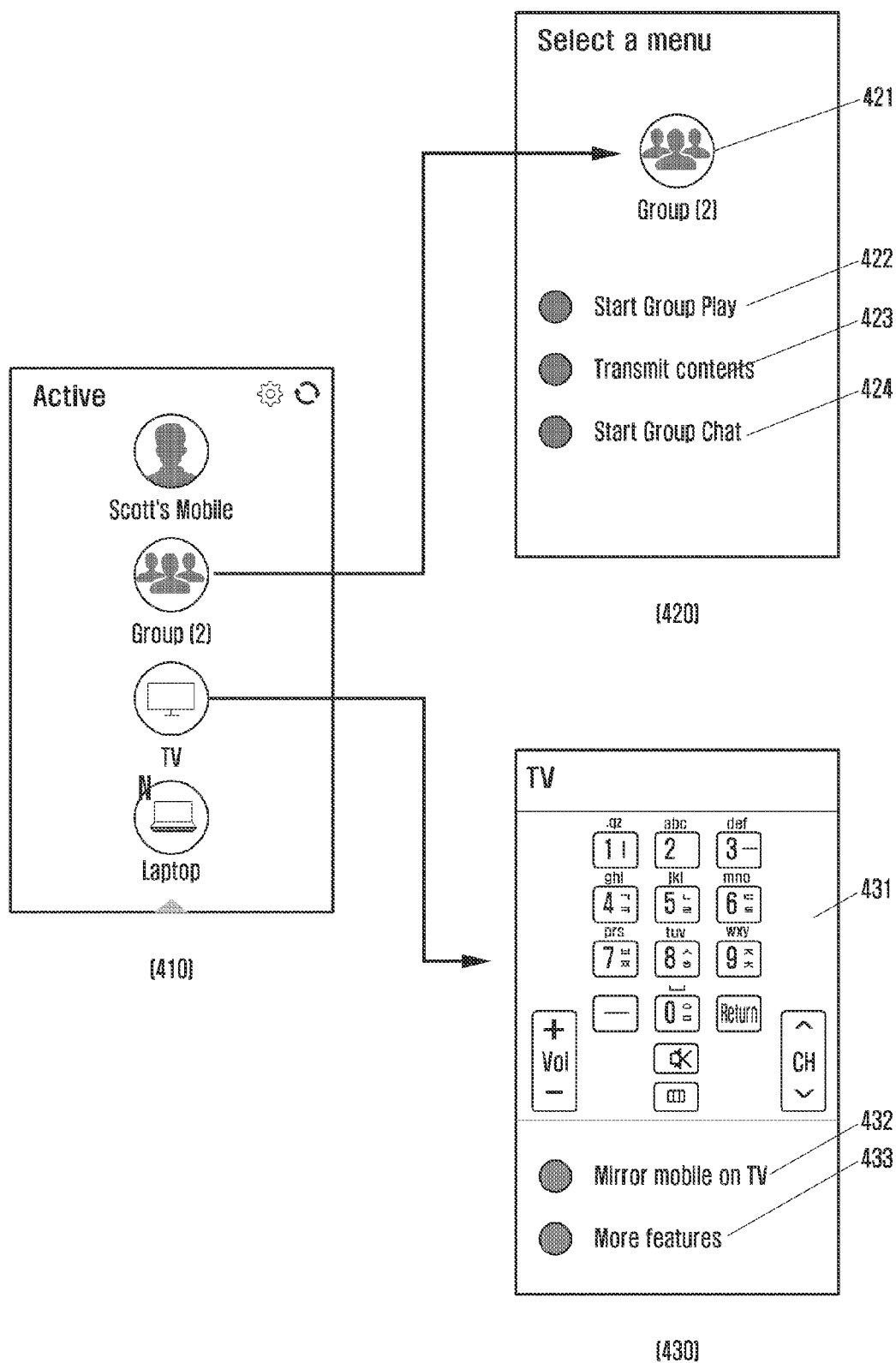
FIG. 4 is a diagram illustrating exemplary screen displays of an operation of selecting one of a connected device according to an embodiment of the present disclosure.

FIG. 4 is a diagram illustrating exemplary screen displays of and operation of selecting one of a connected device according to an embodiment of the present disclosure.

Referring to FIG. 4, a mobile device may display the information on the devices connected through diverse communication protocols as shown in part (410). If the user select one of the connected devices, the mobile device may display the applications or functions which make it possible to interoperate with the selected device 421 in the form of text as shown in part (420). The applications or functions include "Start Group Play" 422, "Transmit Contents" 423, and "Start Group Chat" 424. If a television (TV) is selected among the connected devices, the mobile device displays a remote function execution window 431 as shown in part (430). The remote function execution window may be displayed with the buttons for executing other functions such as "Mirror mobile on TV" 432 and "More features" 433.

Figure 5:
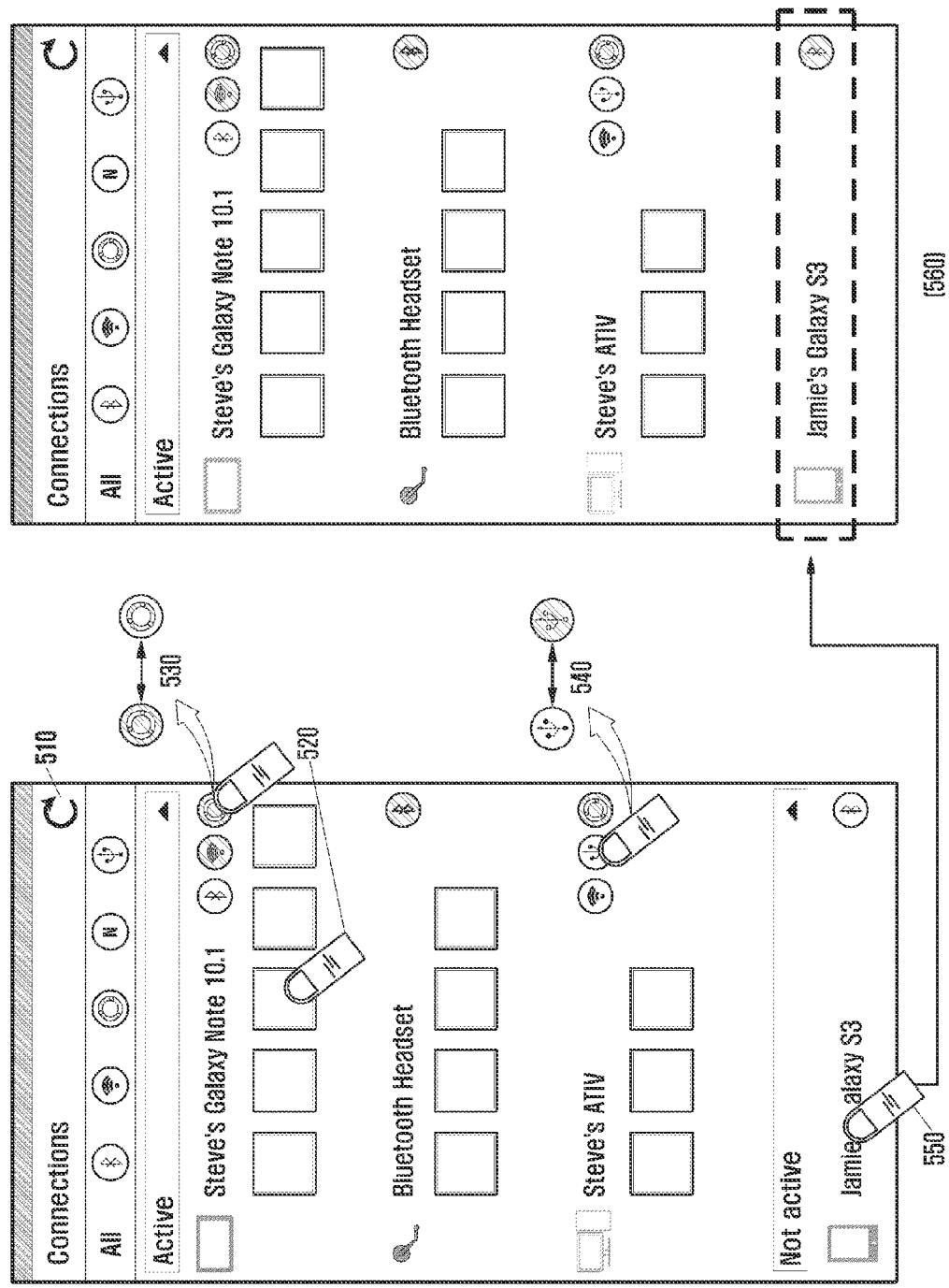
FIG. 5 is a diagram illustrating exemplary screen displays of an operation of displaying connected and non-connected communication protocols icons according to an embodiment of the present disclosure.

FIG. 5 is a diagram illustrating exemplary screen displays of an operation of displaying connected and non-connected communication protocols icons according to an embodiment of the present disclosure.

Referring to FIG. 5, if the user selects an update button 510, a mobile device discovers the devices connectable through a predetermined communication protocol or diverse communication protocols. The predetermined communication protocol may be the protocol preset by the user or the default protocol of the communication device. After the discovery of the devices connectable through diverse communication protocols, if the update button is selected, the mobile device search again for the device connectable through the predetermined communication unit or multiple communication protocols.

The mobile device also may execute an application in response to the user's selection of a symbol as denoted by reference number 520. According to an embodiment, the symbol of the communication protocol is provided in the form of a toggle key such that if the user selects the symbol of the connected communication protocol, the mobile device releases the connection and the symbol is deactivated. The symbol of the communication protocol switches between an active state and an inactive state whenever being selected. If the symbol of the Samsung link as the connected protocol is selected as denoted by reference number 530, the mobile device releases the communication channel established with the Samsung link such that the Samsung link symbol is presented in the inactive state. If the symbol of the USB in the inactive state is selected, the mobile device attempt establishing a USB connection such that the USB symbol is presented in the active state as denoted by reference number 540. If a connectable device is selected by the user ad denoted by reference number 550, the mobile device may attempt establishing a communication link with the connectable device and, if the connection link is established, the connectable device becomes the connected device as shown in part (560).

TABLE 1

| Target device type | Action list | Relevant services | Following task screen |
|---|---|---|---|
| Mobile | 1. Start Group Play | Group Play | 1. Group Play's menu list screen |
|  | 2. Send current contents | — | 2. Start transferring |
|  | 3. Send other contents | — | 3. My files selection screen |
| Tablet | 1. Start Group Play | Group Play | 1. Group Play's menu list screen |
|  | 2. Send current contents | — | 2. Start transferring |

TABLE 1-continued

| Target device type | Action list | Relevant services | Following task screen |
|---|---|---|---|
| | 3. Send other contents | — | 3. My files selection screen |
| | 4. Mirror mobile on tablet | Side Sync | 4. Previous screen (Notify the status with toast popup) |
| | 5. Browse contents | Samsung Link, Samsung account | 5. Samsung Link's file-exploring screen |
| PC | 1. Send current contents | — | 1. Start transferring |
| | 2. Send other contents | — | 2. My files selection screen |
| | 3. Control mobile from PC | Side Sync | 3. Previous screen (Notify the status with toast popup) |
| | 4. Mirror mobile on PC | Side Sync | 4. Previous screen (Notify the status with toast popup) |
| | 5. Browse contents | Samsung Link, Samsung account | 5. TV screen (Notify the status with toast popup) |
| | | | 6. Samsung Link's file-exploring screen |
| TV | 1. Mirror mobile on TV | Screen mirroring | 1. Previous screen (Notify the status with toast popup) |
| | 2. More features (Mini control panel) | [Dedicated app] | 2. TV screen (Notify the status with toast popup) |
| Home appliance | 1. More features (Mini control panel) | [Dedicated app] | |
| Home Sync | 1. Browse contents | Samsung Link, Samsung account | 1. Samsung Link's file-exploring screen |
| | 2. More features (Mini control panel) | [Dedicated app] | |
| Accessory | 1. Connect | — | 1. Previous screen (Notify the status with toast popup) |
| | 2. Search on web | — | 2. Samsung Link's file-exploring screen |
| Unknown | 1. Connect | — | 1. Previous screen (Notify the status with toast popup) |
| | 2. Search on web | — | 2. Web search result about the device info |

TABLE 2

| Target device type | Action screen | Relevant services | Following task screen |
|---|---|---|---|
| Mobile (Tablet) | 1. Auto-send photos to mobile | Samsung account | 1. Send pictures to the connected mobile automatically |
| | 2. Send pictures to mobile | Auto share | 2. Select pictures to send |
| | 3. Remote view finder | Remote view finder | 3. Changes to remote view finder screen |
| | 4. Shoot pictures together | Camera (Share shot) | 4. Changes to shooting mode (Share shot) |
| PC | 1. Auto share to PC | Samsung account | 1. Send pictures to the connected PC automatically |
| | 2. Send pictures to mobile | Auto share | 2. Select pictures to send |
| | 3. Browse contents | Samsung Link | 3. Samsung Link's file-exploring screen |
| TV | 1. Mirror camera on TV | Screen mirroring | 1. Previous screen (Notify the status with toast popup) |
| | . More features | | 2. TV screen (Notify the status with toast popup) |
| Home Sync | 1. Browse contents | Samsung Link, Samsung account | 1. Samsung Link's file-exploring screen |
| | 2. More features | | |
| Accessory | 1. Connect | — | 1. Previous screen (Notify the status with toast popup) |
| | 2. Search on web | — | 2. Samsung Link's file-exploring screen |

Table 1 shows applications or functions per device type, and table 2 shows the applications or functions associated with the camera.

Figure 6A:
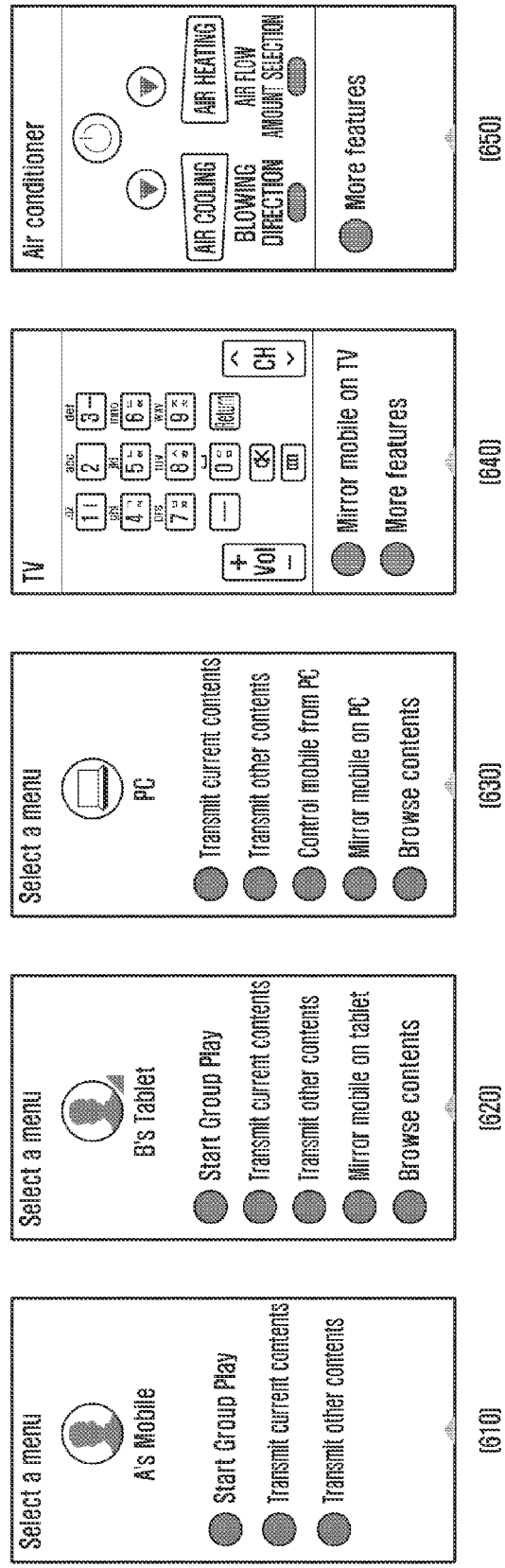
FIGS. 6A and 6B are diagrams illustrating exemplary screen displays of operations of executing applications or functions for use in interoperation with a connected device according to an embodiment of the present disclosure.
Figure 6B:
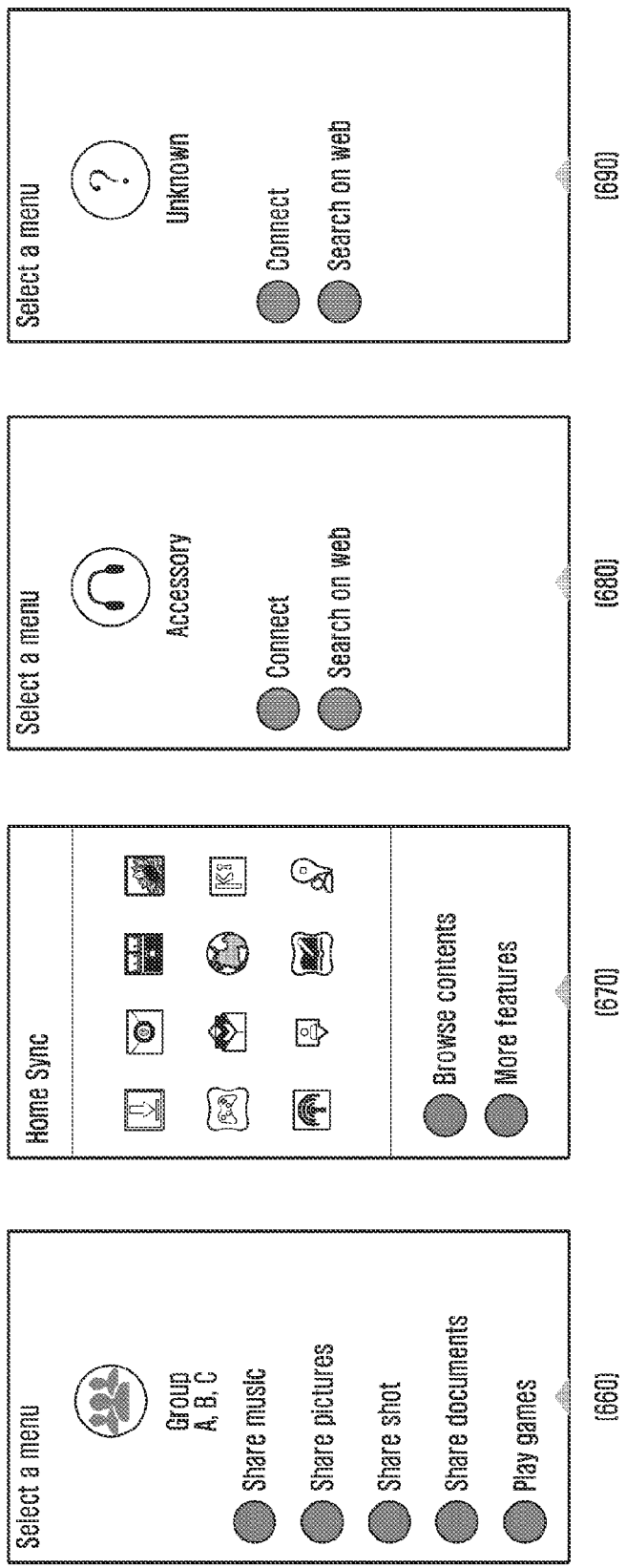

FIGS. 6A and 6B are diagrams illustrating exemplary screen displays of operations of executing applications or functions for use in interoperation with a connected device according to an embodiment of the present disclosure.

Referring to FIG. 6A and tables 1 and 2, a mobile device may display applications or functions for use in interoperation with the device represented by the device icon (name and/or image). If a connected device is "A's Mobile," the mobile device displays the application ("start group play) and functions ("transmit current contents" and "transmit other contents") for use in interoperation with the A;s Mobile as shown in part (610). If the connected device is "B's Tablet," the mobile device displays the application ("start group play," "mirror mobile on tablet," and "browse contents") and functions ("start group play" and "transmit other contents") for use in interoperation with the B's Tablet as shown in part (620). If the connected device is "PC," the mobile device displays the applications ("control mobile from PC," "Mirror mobile on PC," and "Browse contents") and functions ("transmit current contents" and "transmit other contents") for use in interoperation with the PC as shown in part (630). If the connected device is "TV," the mobile device displays the functions ("Remote controller," "Mirror mobile on TV," and "more feature") for use in interoperation with the TV as shown in part (660). If the connected device is "Air conditioner," the mobile device displays the functions ("Remote controller" and "other features") for use in interoperation with the air conditioner as shown in part (650).

Referring to FIG. 6B and tables 1 and 2, if the connected device is "Group A, B, C," the mobile device displays the applications (camera and game) and functions ("share music," "share pictures," and "share documents") for use in interoperation with "Group A, B, C" as shown in part (660). If the connected device is "Home sync," the mobile device displays the applications (represented by icons) and functions ("Browse contents" and "more features") for use in interoperation with "Home Sync" as shown in part (670). If the connected device is "Accessory," the mobile device displays the application ("Search on web") and function ("Connect") for use in interoperation with "Accessory" as shown in part (680). If there is no information on the connected device, the mobile device displays the device name as "Unknown" and the application ("Search on web") and function ("Connect") for use in interoperation with the "Unknown" as shown in part (690).

FIG. 7 is a diagram illustrating an operation of establishing a connection with a device by pointing at a corresponding device according to an embodiment of the present disclosure.

Referring to FIG. 7, the mobile device may display the information on the devices (a Speaker, a Set-top box, a Living room TV, and a Printer) connectable through diverse communication protocols as denoted by reference number 710. If the user points at the position where one of the devices is located using the mobile device, the mobile device attempts establishing a connection with the pointed device. For example, if the user points at the position where the "A's Mobile Phone" is placed with the mobile device as denoted by reference number 730, the mobile device attempts establishing a connection with the "A's Mobile Phone." If the connection is established, the mobile device displays the icon representing the connected device distinctly from other device icons as denoted by reference number 731. If the user points at the position where the "Printer" is placed with the mobile device as denoted by reference number 740, the mobile device attempts establishing a connection with the "Printer." If the connection is established, the mobile device may display the icon representing the "Printer" distinctly from other device icons as denoted by reference number 741.

According to another embodiment, in the state that more than one device is displayed, if the user points at a position where the devices are placed, the mobile device may attempt establishing connections with the respective devices. For example, if the user points at the position where the Speaker, Set-top box, and Living room TV are placed as denoted by reference number 720, the mobile device attempts establishing connections with the Speaker, Set-top box, and Living room TV. If the connections are established, the mobile device may display the icons representing the Speaker, Set-top box, and Living room TV distinctly from other devices as denoted by reference number 721.

FIG. 8 is a diagram illustrating an operation of determining whether execution-requested application is installed according to an embodiment of the present disclosure.

Referring to FIG. 8, the mobile device receives a user's selection of applications (Action A and Action B) for use in interoperation with the PC connected though a communication link at operation 810. The mobile device determines whether the selected applications are installed at operation 820. If the applications are installed, the mobile device executes the selected applications (Action A and Action B) at operation 830. Otherwise, if the applications are not installed, the mobile device installs the selected applications (Action A and Action B) in operation 840 and, once the applications are installed completely, executes the applications (Action A and Action B) at operation 830.

Figure 9:
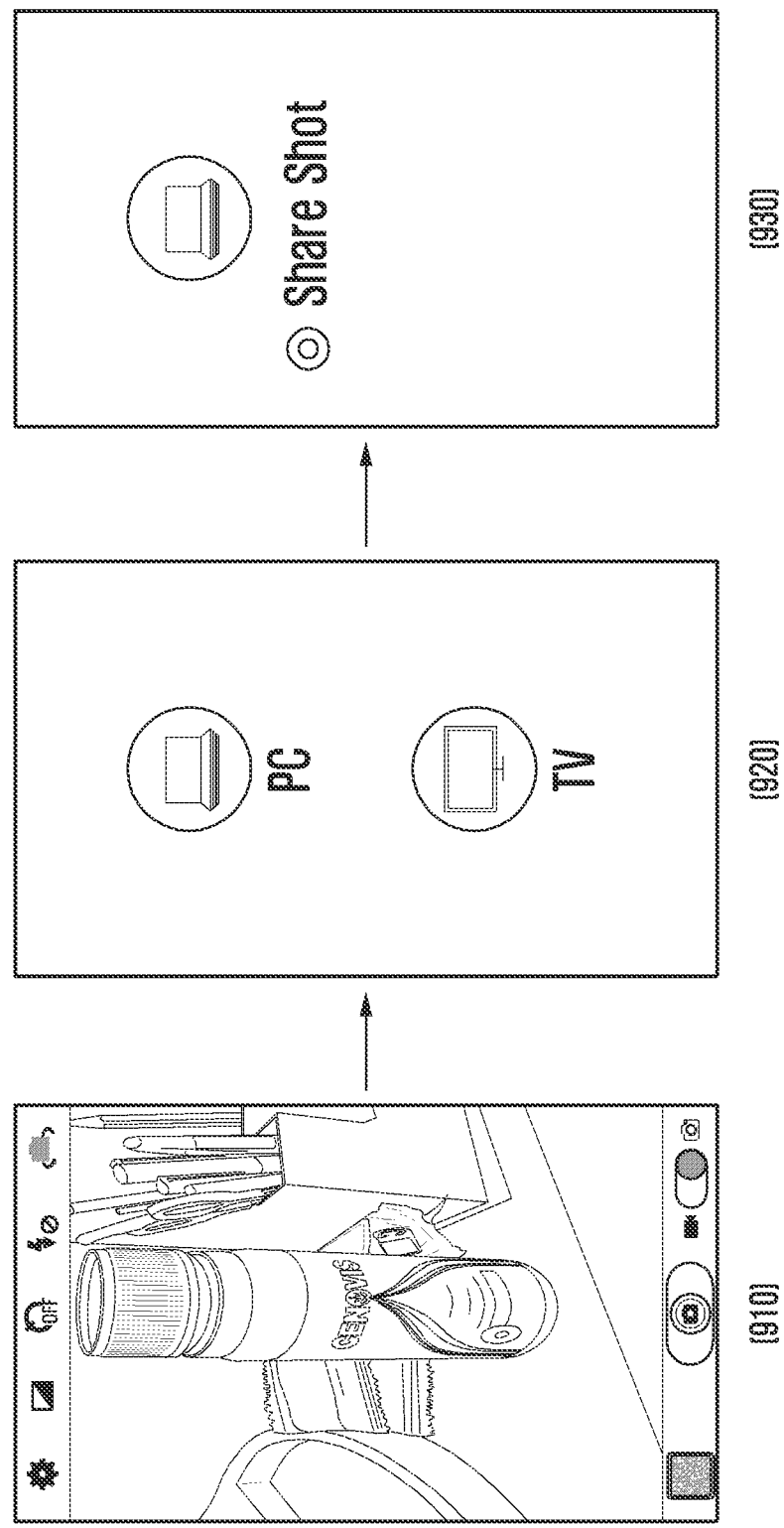
FIG. 9 is a diagram illustrating exemplary screen displays of an operation of executing a specific application when a predetermined condition is fulfilled according to an embodiment of the present disclosure.

FIG. 9 is a diagram illustrating exemplary screen displays of an operation of executing a specific application when a predetermined condition is fulfilled according to an embodiment of the present disclosure.

Referring to FIG. 9, if the predetermined condition is fulfilled, the mobile device attempts establishing a communication link with a predetermined device or the device which has been connected under the predetermined condition with priority. For example, if the camera is activated as shown in the exemplary screen 910, the mobile device may transmit a picture taken by the camera or attempt establishing a communication link with the PC or TV having the mirror function as shown in the exemplary screen 920. If the communication link is established, the mobile device may display the function (share shot) for use in interoperation with the camera as shown in the exemplary screen 930.

Figure 10:
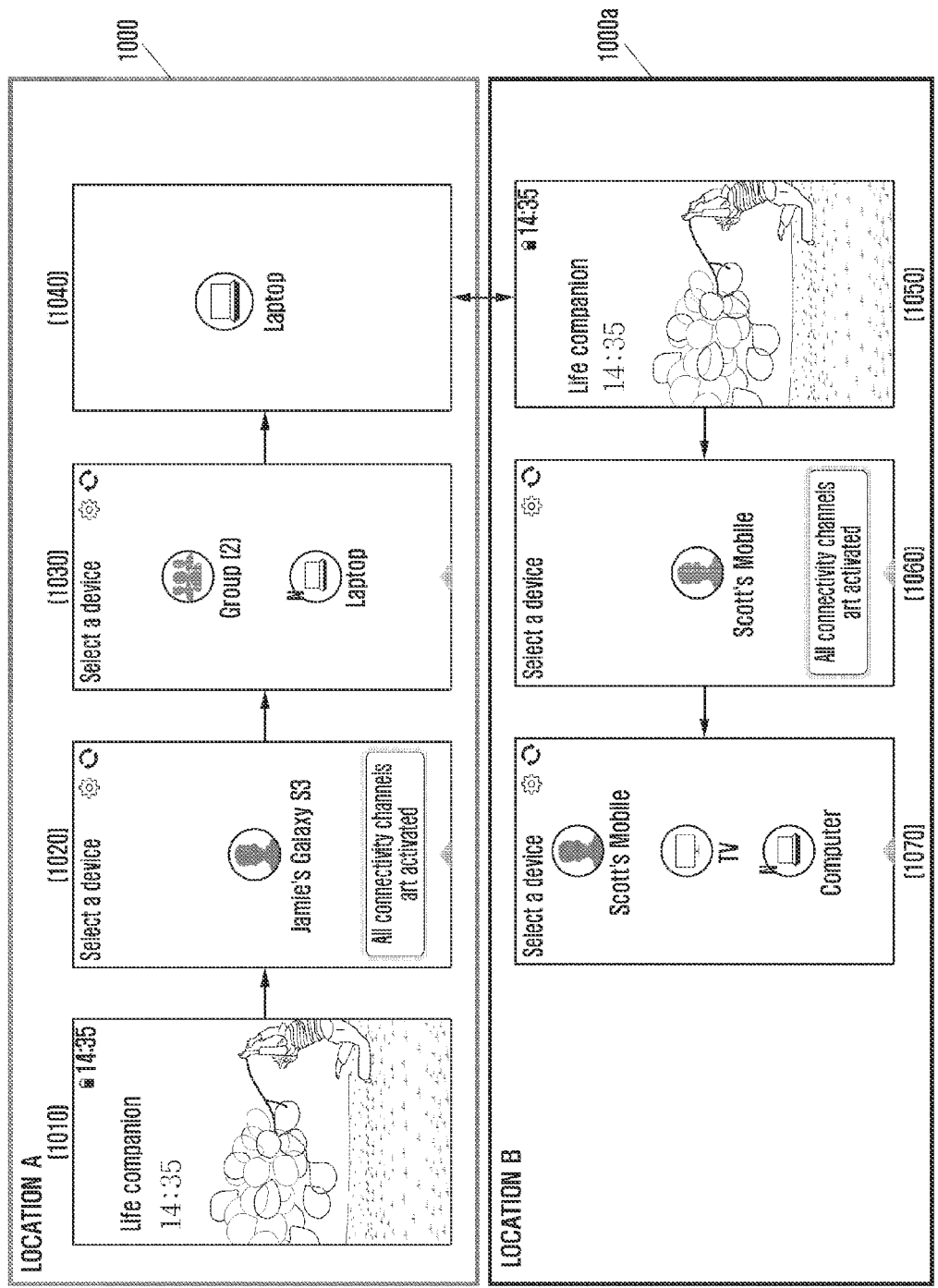
FIG. 10 is a diagram illustrating exemplary screen displays of an operation of establishing a communication link with a predetermined device when a predetermined condition is fulfilled according to an embodiment of the present disclosure.

FIG. 10 is a diagram illustrating exemplary screen displays of an operation of establishing a communication link with a predetermined device when a predetermined condition is fulfilled according to an embodiment of the present disclosure.

Referring to FIG. 10, if a mobile device in a standby mode as shown in part (1010) enters a predetermined location 1000, the mobile device discover the devices (Jamie's Galaxy S3) connectable through diverse communication protocol automatically as shown in part (1020). The mobile device may display the information on discovered devices (Group and Laptop) in order as shown in part (1030). At this time, the mobile device may attempt establishing a connection with a predetermined device or the device which has been connected under a predetermined condition with priority at the predetermined location. The mobile device may establish a communication link with the "Laptop" with priority or in response to the user's selection of "Laptop" at the predetermined location.

According to an embodiment, the mobile device may maintain the communication link with the predetermined device at the predetermined location during a predetermined time period. For example, the mobile device may be configured to maintain the connection with the "Laptop" during the working hours (9 hours: 9:00~18:00) at the office. According, even when the user goes out of the office for lunch, the mobile device may maintain the connection with the "Laptop" during the working hours.

According to an alternative embodiment, once the connection predetermined device is established at the predetermined location, the mobile terminal may execute a predetermined unction automatically. For example, if it is connected to the TV at home, the mobile device may control the TV to play a predetermine channel automatically. That is, if the user is at home, the mobile device may establish a connection with the TV and transmit the information on the predetermined channel to the TV to play the channel. At this time, this operation may be performed in consideration of a predetermined time. For example, the mobile terminal may establish the connection with the TV at 8 PM to control the TV to play the predetermined channel.

The mobile device may determine whether the current location is changed. If the current location is changed, the mobile device enters the standby mode as shown in part (1050) and discovers the devices (Scott's Mobile) connectable through diverse communication protocol at the new location 1000a as shown in part (1060). The mobile device may display the information on the discovered devices (Scott's Mobile, TV, and Computer) in order as shown in part (1070).

Figure 11:
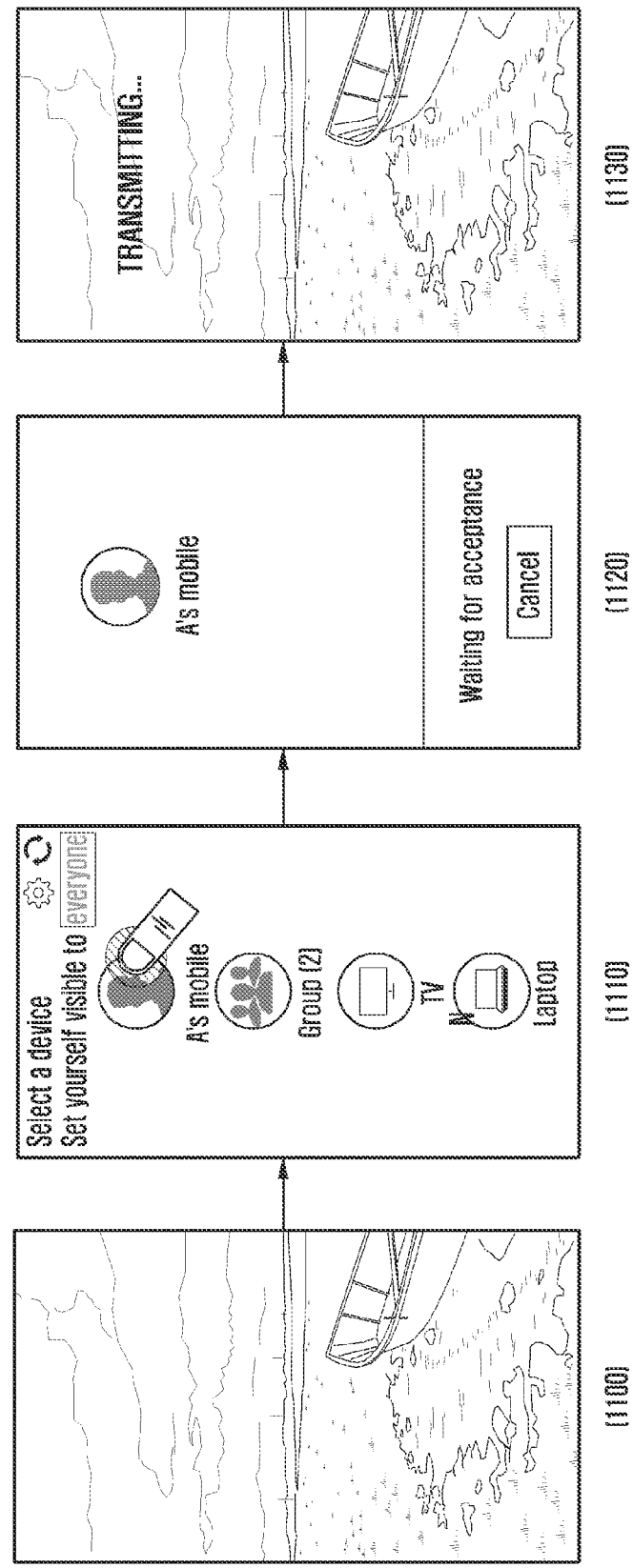
FIG. 11 is a diagram illustrating exemplary screen displays of an operation of transmitting data when a predetermined condition is fulfilled according to an embodiment of the present disclosure.

FIG. 11 is a diagram illustrating exemplary screen displays of an operation of transmitting data when a predetermined condition is fulfilled according to an embodiment of the present disclosure.

Referring to FIG. 11, if a predetermined condition is fulfilled, a mobile device may execute a predetermined application or function with priority. For example, the mobile device may receive a user's selection of at least one device connectable through diverse communication protocol as shown in part (1110) in the state of displaying a content as shown in part (1100). The mobile device also may attempt connection to the selected device (A's Mobile) as shown in part (1120). Once the connection to the selected device (A's Mobile) is established, the mobile device may transmit the content displayed on the screen to the selected device (A's Mobile) as shown in part (1130).

Figure 12:
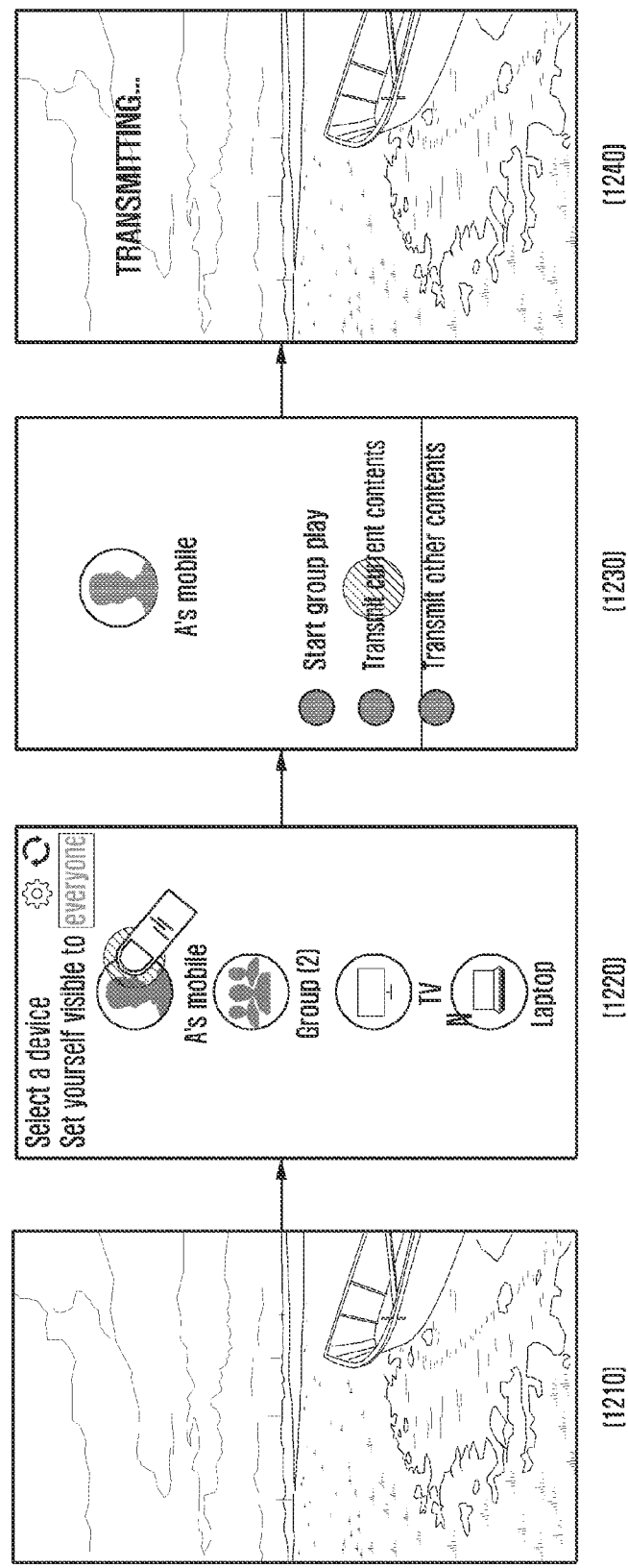
FIGS. 12 and 13 are diagrams illustrating exemplary screen displays of operations of transmitting data to a selected device according to an embodiment of the present disclosure.
Figure 13:
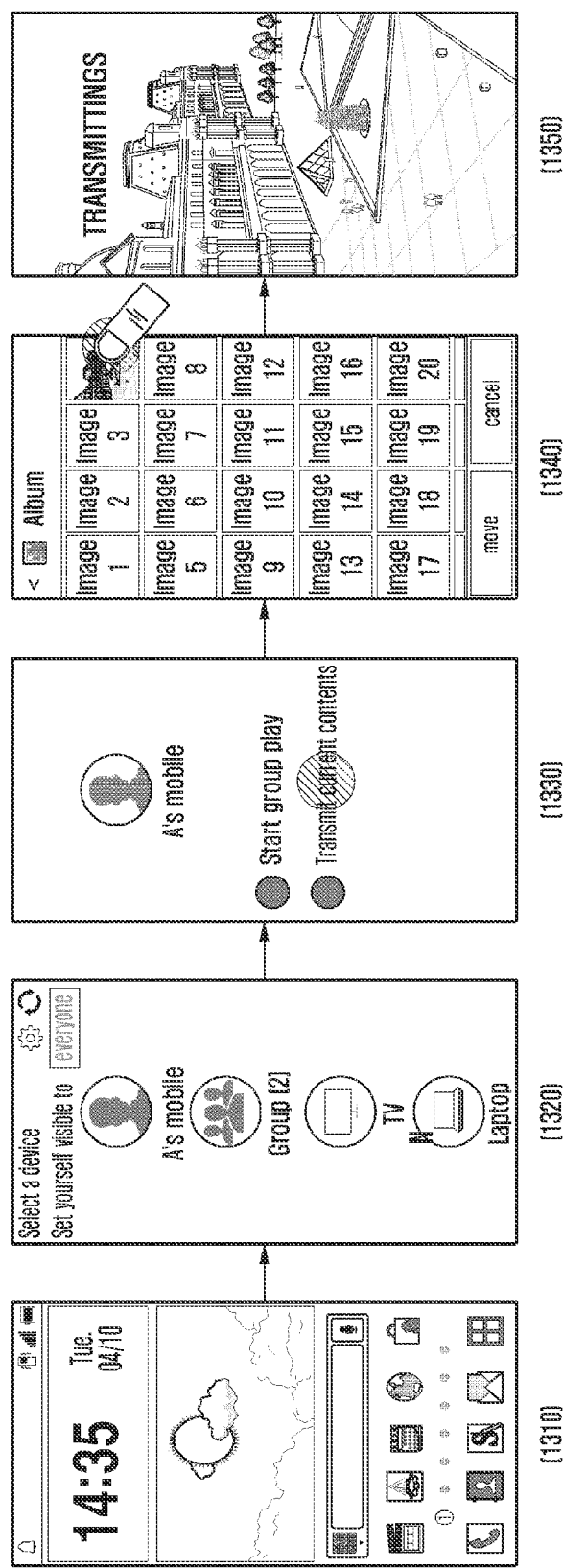

FIGS. 12 and 13 are diagrams illustrating exemplary screen displays of operations of transmitting data to the selected device according to an embodiment of the present disclosure.

Referring to FIG. 12, if a predetermined condition is fulfilled, a mobile device may display connected devices, and if one of the devices is selected, transmit data to the selected device. For example, the mobile device may determine whether a predetermined key is selected, a communication protocol settings screen is requested, or a predetermined touch is detected on the screen, in the state of displaying a content as shown in part 1210. If the predetermined condition is fulfilled, the mobile device may select one of the devices connectable through diverse communication protocols as shown in part (1220). The mobile device may display the application ("Start group play") and function ("Transmit current content" and "Transmit other contents") for use in interoperation with the selected device (A's Mobile) and receive the user's selection of one of the displayed application and functions as shown in part (1230). The mobile device may transmit the content displayed on the screen to the selected device (A's Mobile) according to the selected function ("transmit current contents") as shown in part (1240).

Referring to FIG. 13, a mobile device may determine whether a predetermined condition (i.e., one of whether a specific key is selected, whether a communication protocol settings screen is requested, or whether a predetermined touch is detected on the screen) is fulfilled in the state of displaying the background screen as shown in part (1310). If the predetermined condition is fulfilled, the mobile device may display the devices connectable through diverse communication protocols as shown in part (1320). The mobile device receives the user selection of one of the devices and displays the application ("Start group play") and function ("Transmit current content") for use in interoperation with the selected device (A's Mobile) as shown in part (1330). The mobile device may execute an album including contents according to the selected function ("Transmit current contents") as shown in part (1340). The mobile device may transmit the selected device (A's Mobile), the picture selected form the album by user as shown in part (1350).

Figure 14:
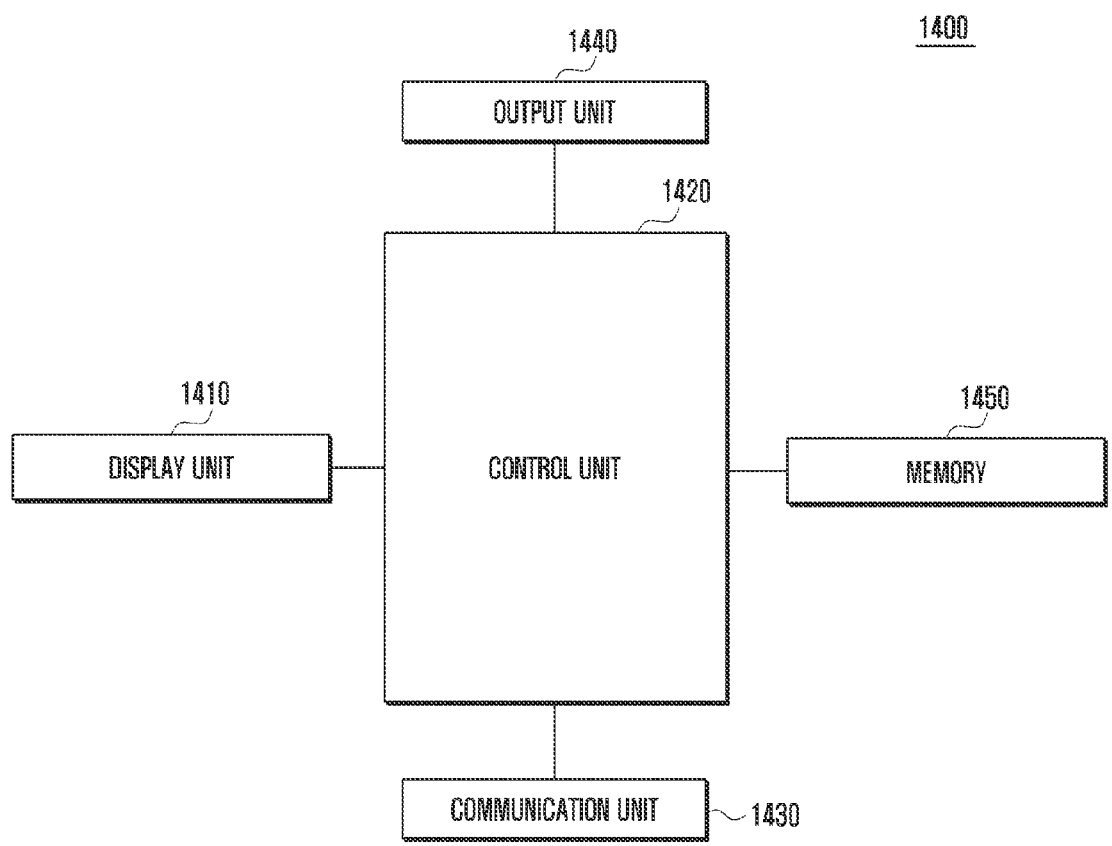
FIG. 14 is a block diagram illustrating a configuration of a mobile device according to an embodiment of the present disclosure.

FIG. 14 is a block diagram illustrating a configuration of a mobile device according to an embodiment of the present disclosure.

Referring to FIG. 14, a mobile device 1400 includes a display unit 1410, a control unit 1430, an output unit 1440, and a memory 1450.

The control unit 1420 controls all of the components of the mobile device 1400. The control unit 1420 discovers the devices connectable through diverse communication protocols. The communication protocols my include Bluetooth, Wi-Fi, Samsung link, NFC, and USB. If a predetermined condition (i.e., one of whether a specific key is selected, whether a communication protocol settings screen is requested, or whether a predetermined touch is detected on the screen), the control unit 1420 discovers the devices connectable through diverse communication protocols. That is, the control unit 1420 may discover the devices connectable through diverse communication protocols at a time.

The display unit displays at least one image on the screen under the control of the control unit 1420. That is, the control unit 1420 processes the data into an image (e.g., decodes the data) and buffers the processed data in a buffer, the display unit 1410 converts the buffered image into the analog signal for display on the screen. The display unit 1410 may be implemented with one of Liquid Crystal Display (LCD), Organic Light Emitting Diodes (OLED), Active Matrix OLED (AMOLED), and flexible display. According to an embodiment of the present disclosure, the display unit 1410 may be implemented as a touchscreen capable of displaying image and receiving touch input simultaneously.

The display unit 1410 displays the discovered devices, symbols of the communication protocols supported by the devices, and icons representing the applications and/or functions for use in interoperation with the devices.

At this time, the control unit 1420 may control the display 1410 to display the discovered devices such that the connected devices group and connectable devices group are distinct from each other. The control unit 1420 may control the display unit 1420 to display the symbols in the order of the priorities of the communication protocols. The control unit 1420 may control such that the icons representing the applications and/or functions in association with the connected devices are shown or hidden on the screen of the display unit 1410. The control unit 1420 may control such that the symbols of the activated communication protocols of the connected device is displayed distinctly from the symbols of the deactivated communication protocols of the connected device. The control unit 1420 also may control such that a communication protocol symbol is toggled between the connected state and disconnected state in response to a selection input.

According to an embodiment, if a update button is selected by the user, the control unit 1420 performs device discovery again to discover the devices connected through a predetermined communication protocol or diverse communication protocols.

According to an alternative embodiment, if the application or function selected by the user is not installed in the mobile device 1400, the control unit 1420 installs the selected application or function in the mobile device 1400 and executes the installed application or function.

The communication unit 1430 may control the voice communication, video communication, and data communication with another device through a network under the control of the control unit 1420. The communication unit 1430 may include a Radio Frequency (RF) transmitter for frequency-up-converting and amplifying a signal to be transmitted and an RF receiver for low-noise-amplifying and down-converting the received signal. The communication unit 1430 may include at least one of a cellular communication module (e.g., a 3rd Generation (3G) cellular communication module, a 3.5G cellular communication module, and a 4G cellular communication module), a digital broadcast module (e.g., a Digital Multimedia Broadcasting (DMB) module), and a short range communication module (e.g., a Wi-Fi module, a Bluetooth module, and a NFC module).

If the user points at a position where the displayed device is located with the mobile device, the communication unit 1430 may attempt connection to the corresponding device. In the state that multiple discovered devices are displayed, if the user points at the position where the multiple devices are located, the communication unit 1430 attempts connections to the corresponding devices.

If a predetermined condition is fulfilled, the communication unit 1430 may attempt connection to a predetermined device or the device which has been connected under the predetermined condition with priority under the control of the control unit 1420. If the predetermined condition is fulfilled, the communication unit 1430 may execute a predetermined application or function with priority under the control of the control unit 1420.

If the predetermined condition is fulfilled, the control unit 1420 controls the display unit 1410 to display the connected devices and, if one of the devices is selected, controls the communication unit 1430 to transmit data to the selected device.

The output unit 1440 may be an audio processing unit which outputs audio included in the multimedia control under the control of the control unit 1420. Typically, the audio processing unit includes a Speaker (SPK) and a Microphone (MIC) for input and output of audio signals (e.g., voice data) associated with voice recognition, voice recording, digital recording, and telephony functions. The audio processing unit may receive the audio signal from the control unit 1420, converts the digital audio signal to analog audio signal (D/A conversion), and amplify and output the analog audio signal through the SPK. The SPK outputs the audio signal in the form of an audible sound wave. The MIC may convert the sound waves from the human or other sound sources to audio signals.

The memory 1450 may store pictures, documents, applications, music files, and preset parameter values and conditions for use in the mobile device 1400. The memory 1450 may include a secondary memory unit of the mobile device 1400 such as a disc, a Random Access Memory (RAM), a Read Only Memory (ROM), and a flash memory.

As described above, the display method and mobile device of the present disclosure is advantageous in terms of displaying diverse communication protocols, devices connected through the respective communication protocols, and applications executable in association with the devices through the communication protocols at a time so as to improve user convenience.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point, it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be therein without departing from the spirit and scope of the present disclosure as defined by the appended claims and their equivalents.

What is claimed is:

1. A communication protocol information display method of a mobile device, the method comprising:
    discovering devices connectable through diverse communication protocols;
    displaying information on the discovered devices;
    displaying, for each of the discovered devices respectively, symbols indicating communication protocols respectively, wherein the communication protocols allow the discovered devices to communicate with the mobile device;
    displaying, for each of the discovered devices respectively, image objects associated with applications or functions with which the mobile device is capable of interoperating with the discovered devices; and
    attempting, when the mobile device is disposed to point at a position where at least one of the discovered devices is placed with the mobile device, a connection to the at least one of the discovered devices.

2. The method of claim 1, wherein the discovering of the devices comprises:
    determining whether a touch gesture moves downward from a top edge of a screen of the mobile device or upward from a bottom edge of the screen; and
    discovering, when the touch gesture moves downward from the top edge of the screen or upward form the bottom edge of the screen, the devices connectable through the diverse communication protocols.

3. The method of claim 1, wherein the displaying of the information on the discovered devices comprises:
    sorting the discovered devices into connected devices and connectable devices; and
    displaying the connected devices and connectable devices distinctly from each other.

4. The method of claim 3, wherein the displaying of the image objects associated with the applications or functions comprises:
    showing the applications or functions associated with the applications or functions interoperating with the connected devices; and
    hiding the applications or functions associated with the applications or functions interoperating with the connectable devices.

5. The method of claim 1, wherein the displaying of the symbols comprises displaying each symbol indicating the communication protocols in an activated state or a deactivated state per discovered device distinctly from each other.

6. The method of claim 5, further comprising toggling each symbol between the activated state and the deactivated state in response to a selection input.

7. The method of claim 1, wherein the displaying of the symbols comprises displaying the symbols in an order of priorities of the communication protocols.

8. The method of claim 1, wherein the displaying of the image objects comprises:

receiving a user's selection of one of the applications or functions;

installing, when the selected application or function is not installed in the mobile device, the selected one of the applications or functions in the mobile device; and executing the installed one of the applications or functions.

9. The method of claim 1, further comprising discovering, when an update input is detected, the devices connectable through a predetermined communication protocol or the diverse communication protocols.

10. The method of claim 1, further comprising attempting, when a predetermined condition is fulfilled, a connection to a predetermined device or the device which has been connected under the condition with priority.

11. The method of claim 1, further comprising executing, when a predetermined condition is fulfilled, a predetermined application or function with priority.

12. The method of claim 1, further comprising:

displaying, when a predetermined condition is fulfilled, connected devices; and transmitting, when one of the connected devices is selected, data to the selected device.

13. A mobile device comprising:

at least one processor;

a transceiver; and a display, wherein the at least one processor is configured to:

discover devices connectable through diverse communication protocols, control the display to display information on the discovered devices, control the display to display, for each of the discovered devices respectively, symbols indicating communication protocols respectively, wherein the communication protocols allow the discovered devices to communicate with the mobile device, control the display to display, for each of the discovered devices respectively, image objects associated with applications or functions with which the mobile device is capable of interoperating with the discovered devices, and control the transceiver to attempt, when the mobile device is disposed to point at a position where at least one of the discovered devices is placed with the mobile device, a connection to the at least one of the discovered devices.

14. The mobile device of claim 13, wherein the at least one processor is further configured to:

determine whether a touch gesture moves downward from a top edge of a screen of the mobile device or upward from a bottom edge of the screen, and discover, when the touch gesture moves downward from the top edge of the screen or upward form the bottom edge of the screen, the devices connectable through diverse communication protocols.

15. The mobile device of claim 13, wherein the at least one processor is further configured to sort the discovered devices into connected devices and connectable devices and display the connected devices and connectable devices distinctly from each other.

16. The mobile device of claim 15, wherein the at least one processor is further configured to:

control the display to display the applications or functions associated with the applications or functions interoperating with the connected devices, and hide the applications or functions associated with the applications or functions interoperating with the connectable devices.

17. The mobile device of claim 13, wherein the at least one processor is further configured to control the display to display each symbol indicating the communication protocols in an activated state or a deactivated state per discovered device distinctly from each other.

18. The mobile device of claim 17, wherein the at least one processor is further configured to toggle each symbol between the activated state and the deactivated state in response to a selection input.

19. The mobile device of claim 13, wherein the at least one processor is further configured to control the display to display the symbols in an order of priorities of the communication protocols.

20. The mobile device of claim 13, wherein the at least one processor is further configured to detect a user's selection of one of the applications or functions, install, when the selected one of the applications or functions is not installed in the mobile device, the selected application or function in the mobile device, and execute the installed one of the applications or functions.

21. The mobile device of claim 13, wherein the at least one processor is further configured to determine, when an update input is detected, the devices connectable through a predetermined communication protocol or the diverse communication protocols.

22. The mobile device of claim 13, wherein the at least one processor is further configured to control the transceiver to attempt, when a predetermined condition is fulfilled, a connection to a predetermined device or the device which has been connected under the condition with priority.

23. The mobile device of claim 13, wherein the at least one processor is further configured to execute, when a predetermined condition is fulfilled, a predetermined application or function with priority.

24. The mobile device of claim 13, wherein the at least one processor is further configured to:

control the display to display, when a predetermined condition is fulfilled, the connected devices, and control the transceiver to transmit, when one of the connected devices is selected, data to the selected device.

25. The mobile device of claim 13, wherein the image objects associated with the applications or functions are one of a side link icon, a manufacturer link icon, a file exchange icon, a settings icon, or a connection release icon.

26. A non-transitory computer-readable storage medium storing instructions that, when executed, cause at least one processor to perform the method of claim 1.

* * * * *